(12) United States Patent
Nunomura et al.

(10) Patent No.: US 11,033,370 B2
(45) Date of Patent: Jun. 15, 2021

(54) ORAL CAVITY WASHING DEVICE AND NOZZLE FOR THE SAME

(71) Applicant: PANASONIC INTELLECTUAL PROPERTY MANAGEMENT CO., LTD., Osaka (JP)

(72) Inventors: Mahito Nunomura, Kyoto (JP); Shinichi Taniguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 381 days.

(21) Appl. No.: 15/884,285

(22) Filed: Jan. 30, 2018

(65) Prior Publication Data

US 2018/0221123 A1    Aug. 9, 2018

(30) Foreign Application Priority Data

Feb. 7, 2017    (JP) .............................. JP2017-020725

(51) Int. Cl.
*A61C 17/02*    (2006.01)
*A61C 15/00*    (2006.01)
(Continued)

(52) U.S. Cl.
CPC .......... *A61C 17/0202* (2013.01); *A61C 17/02* (2013.01); *A61C 17/028* (2013.01); *A61C 17/14* (2013.01)

(58) Field of Classification Search
CPC ....... A61C 17/02; A61C 17/0202; B05B 1/02; B05B 1/34; B05B 15/18
(Continued)

(56) References Cited

U.S. PATENT DOCUMENTS

| | | | |
|---|---|---|---|
| 3,487,828 A | 1/1970 | Troy | |
| 3,590,813 A * | 7/1971 | Roszyk | ................ A61C 1/0092 601/162 |

(Continued)

FOREIGN PATENT DOCUMENTS

| | | |
|---|---|---|
| CN | 104023670 A | 9/2014 |
| CN | 205073056 U | 3/2016 |

(Continued)

OTHER PUBLICATIONS

The Extended European Search Report dated Jun. 13, 2018 for the related European Patent Application No. 18154404.0.
(Continued)

*Primary Examiner* — Justine R Yu
*Assistant Examiner* — Christopher E Miller
(74) *Attorney, Agent, or Firm* — McDermott Will and Emery LLP

(57) ABSTRACT

An oral cavity washing device includes a nozzle having a flow passage structure and a pump to feed washing liquid to the flow passage structure. The flow passage structure includes: a first component having a first flow passage; a second component being disposed downstream of the first component and having a second flow passage that is narrower than the first flow passage; a third component being disposed downstream of the second component and having a third flow passage that is broader than the second flow passage; a reducer being disposed downstream of the third component and being configured so as to reduce a width of the flow passage; and a fourth component being disposed downstream of the reducer and having a fourth flow passage that widens with an advancement in a path from the reducer to the outlet port so as to generate cavitation in the washing liquid.

10 Claims, 6 Drawing Sheets

(51) Int. Cl.
    *A61C 17/14*   (2006.01)
    *A61C 17/028*  (2006.01)

(58) Field of Classification Search
    USPC .............................. 4/420.1, 420.4, 443, 447
    See application file for complete search history.

(56) References Cited

U.S. PATENT DOCUMENTS

| | | | | |
|---|---|---|---|---|
| 3,828,771 | A * | 8/1974 | Gartner | A61C 17/0217 601/165 |
| 4,185,706 | A * | 1/1980 | Baker, III | E21B 7/18 175/340 |
| 4,342,425 | A * | 8/1982 | Vickers | B05B 13/00 239/424 |
| 4,798,339 | A * | 1/1989 | Sugino | B05B 1/02 175/424 |
| 5,860,942 | A | 1/1999 | Cox | |
| 5,897,062 | A * | 4/1999 | Enomoto | B05B 1/02 239/590 |
| 6,139,319 | A * | 10/2000 | Sauer | A61C 17/0202 433/216 |
| 2006/0097086 | A1* | 5/2006 | Zakharchenko | B05B 1/08 239/590 |
| 2006/0118495 | A1* | 6/2006 | Kondratalv | C02F 1/34 210/748.03 |
| 2007/0248932 | A1* | 10/2007 | Gharib | A61C 17/02 433/81 |
| 2008/0255498 | A1* | 10/2008 | Houle | A61C 17/02 604/20 |
| 2010/0304327 | A1* | 12/2010 | Grez | A61C 17/02 433/88 |
| 2012/0107765 | A1* | 5/2012 | Kloster | A61C 17/0202 433/89 |
| 2014/0272782 | A1* | 9/2014 | Luettgen | A61H 13/005 433/80 |
| 2014/0349246 | A1* | 11/2014 | Johnson | A61C 17/02 433/80 |
| 2014/0378947 | A1* | 12/2014 | Soyama | A61C 17/02 604/514 |
| 2015/0039268 | A1* | 2/2015 | Soyama | B05B 15/18 702/182 |
| 2015/0118643 | A1* | 4/2015 | Lee | A61C 17/0217 433/80 |
| 2015/0164612 | A1* | 6/2015 | Kloster | A61C 17/0202 433/90 |
| 2016/0022394 | A1* | 1/2016 | Chang | A61C 17/0202 433/82 |
| 2016/0022395 | A1* | 1/2016 | Chang | A61C 17/0202 433/82 |

FOREIGN PATENT DOCUMENTS

| | | |
|---|---|---|
| JP | 2007-209509 A | 8/2007 |
| JP | 2015-503382 A | 2/2015 |

OTHER PUBLICATIONS

English Translation of Chinese Search Report dated Dec. 31, 2020 for the related Chinese Patent Application No. 201810090977.5.

\* cited by examiner

| REDUCER ANGLE A1 (°) | 120 | 125 | 130 | 135 | 140 | 145 |
|---|---|---|---|---|---|---|
| CAVITATION BUBBLE | ○ | ○ | ○ | ○ | × | × |

| FOURTH COMPONENT ANGLE A2 (°) | 5.5 | 6.0 | 6.5 | 7.0 | 7.5 |
|---|---|---|---|---|---|
| CAVITATION BUBBLE | ○ | ○ | ○ | × | × |

FIG. 10

| SECOND FLOW PASSAGE INNER DIAMETER D3 (mm) | INTERMEDIATE REGION LENGTH L2 (mm) | | | | | | | |
|---|---|---|---|---|---|---|---|---|
| | 0 | 2.0 | 5.0 | 6.0 | 9.0 | 11.0 | 12.0 | 16.0 |
| 0.7 | × | △ | △ | △ | △ | △ | △ | △ |
| 0.9 | × | △ | △ | △ | △ | △ | △ | △ |
| 1.0 | × | ○ | △ | △ | △ | △ | ○ | △ |
| 1.2 | × | ○ | ○ | ○ | ○ | ○ | △ | △ |
| 1.4 | × | △ | ○ | ⊙ | ○ | ○ | △ | △ |

FIG. 11

| SECOND FLOW PASSAGE INNER DIAMETER D3 (mm) | INTERMEDIATE REGION LENGTH L2 (mm) | | | | | | | | | |
|---|---|---|---|---|---|---|---|---|---|---|
| | 0 | 2.0 | 5.0 | 7.0 | 8.0 | 9.0 | 11.0 | 12.0 | 13.0 | 17.0 |
| 0.7 | × | △ | △ | △ | △ | △ | △ | △ | △ | △ |
| 0.9 | × | △ | △ | △ | △ | △ | △ | △ | △ | △ |
| 1.0 | × | △ | △ | △ | △ | ○ | ⊙ | ⊙ | ⊙ | △ |
| 1.2 | × | △ | △ | △ | ○ | ⊙ | ⊙ | △ | △ | △ |
| 1.4 | × | △ | ⊙ | ⊙ | ⊙ | ⊙ | △ | △ | △ | △ |

FIG. 12

| SECOND FLOW PASSAGE INNER DIAMETER D3 (mm) | INTERMEDIATE REGION LENGTH L2 (mm) | | | | |
|---|---|---|---|---|---|
| | 0 | 2.0 | 7.0 | 11.0 | 13.0 |
| 0.7 | × | △ | △ | △ | △ |
| 0.9 | × | △ | △ | △ | △ |
| 1.0 | × | △ | △ | △ | △ |
| 1.2 | × | △ | △ | △ | △ |
| 1.4 | × | △ | △ | △ | △ |

ORAL CAVITY WASHING DEVICE AND NOZZLE FOR THE SAME

RELATED APPLICATION

This application claims the benefit of Japanese Application No. 2017-020725, filed on Feb. 7, 2017, the entire disclosure of which Application is incorporated by reference herein.

BACKGROUND

1. Technical Field

The present disclosure relates to an oral cavity washing device configured to wash an oral cavity with washing liquid and to a nozzle for the oral cavity washing device.

2. Description of the Related Art

A conventionally known oral cavity washing device includes: a nozzle having a flow passage structure to incorporate a flow passage that includes an inlet port for receiving washing liquid and an outlet port for ejecting the washing liquid; and a pump to feed the washing liquid to the inlet port, for example. PCT Japanese Translation Patent Publication No. 2015-503382 discloses an exemplary conventional oral cavity washing device. The flow passage structure of the known oral cavity washing device includes: a first component having a first flow passage; a reducer disposed downstream of the first component; and a second component disposed downstream of the reducer. The reducer is configured to reduce a width of the flow passage. The second component has a second flow passage that widens with an advancement in a path from the reducer to the outlet port so as to generate cavitation in the washing liquid. The first component and the second component constitute the flow passage. The known conventional oral cavity washing device produces a high washing effect by impact resulting from a burst of bubbles contained in the washing liquid ejected from the outlet port of the nozzle into an oral cavity.

SUMMARY

Presumably, one of factors that influence the effect of washing inside the oral cavity is the quantity of bubbles produced by cavitation generation (hereinafter referred to as "cavitation bubbles"). Meanwhile, when the fluid velocity of the washing liquid flowing through the flow passage of the nozzle is lower than a predetermined fluid velocity, the oral cavity washing device is disabled from generating an appropriate quantity of cavitation bubbles and making an improvement in the effect of washing inside the oral cavity.

An oral cavity washing device according to an exemplary embodiment of the present disclosure includes: a nozzle having a flow passage structure to incorporate a flow passage that includes an inlet port for receiving washing liquid and an outlet port for ejecting the washing liquid; and a pump to feed the washing liquid to the inlet port. The flow passage structure includes: a first component having a first flow passage; a second component being disposed downstream of the first component and having a second flow passage that is narrower than the first flow passage; a third component being disposed downstream of the second component and having a third flow passage that is broader than the second flow passage; a reducer being disposed downstream of the third component and being configured to reduce a width of the flow passage; and a fourth component being disposed downstream of the reducer and having a fourth flow passage that widens with an advancement in a path from the reducer to the outlet port so as to generate cavitation in the washing liquid.

An oral cavity washing device and a nozzle for the same according to the present disclosure contribute to an enhanced washing effect inside an oral cavity.

BRIEF DESCRIPTION OF THE DRAWINGS

FIG. 10 is a table showing results of a fourth test;

FIG. 11 is a table showing results of a fifth test;

FIG. 12 is a table showing results of a sixth test;

Figure 1:
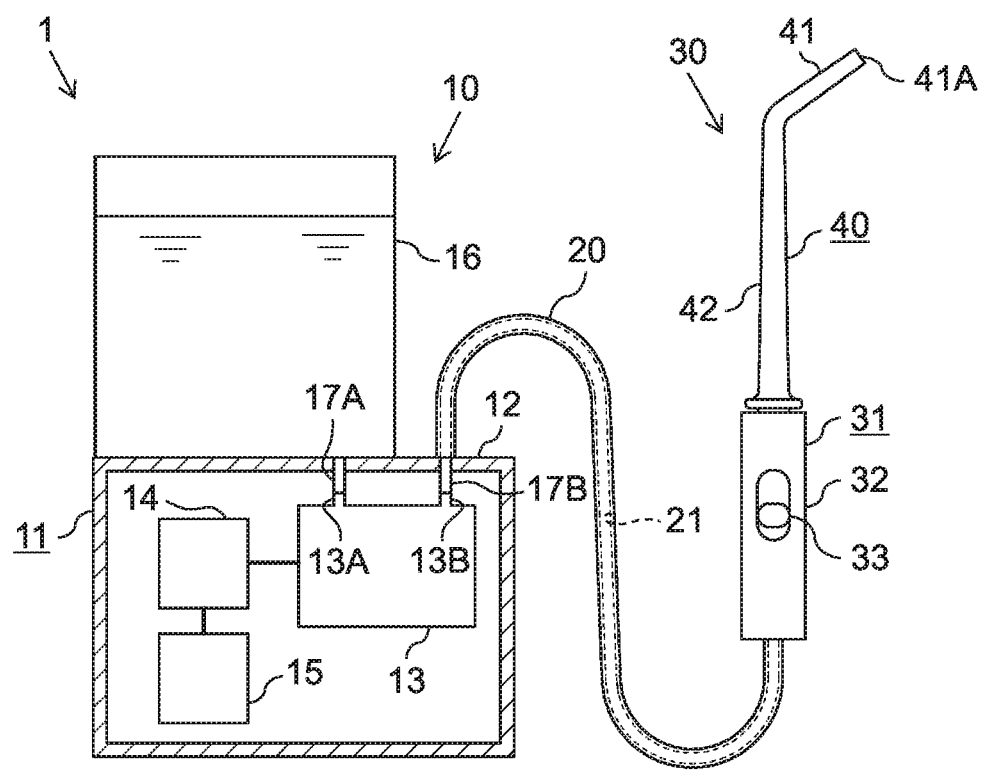
FIG. 1 is a schematic view of an oral cavity washing device according to an exemplary embodiment.

DETAILED DESCRIPTION (One Example of a Mode Which an Oral Cavity Washing Device and a Nozzle for the Same Can Adopt)

An oral cavity washing device according to an exemplary embodiment of the present disclosure includes: a nozzle having a flow passage structure including a flow passage that includes an inlet port for receiving washing liquid and an outlet port for ejecting the washing liquid; and a pump to feed the washing liquid to the inlet port. The flow passage structure includes: a first component having a first flow passage; a second component being disposed downstream of the first component and having a second flow passage that is narrower than the first flow passage; a third component being disposed downstream of the second component and having a third flow passage that is broader than the second flow passage; a reducer being disposed downstream of the third component and being configured to reduce a width of the flow passage; and a fourth component being disposed downstream of the reducer and having a fourth flow passage that widens with an advancement in a path from the reducer to the outlet port so as to generate cavitation in the washing liquid.

The oral cavity washing device allows the washing liquid flowing through the flow passage of the nozzle to pass through the second flow passage and thus increases the fluid velocity of the washing liquid entering into the reducer and the fourth flow passage. This configuration helps the washing liquid to contain a satisfactory quantity of cavitation bubbles for stain removal inside the oral cavity. Accordingly, the oral cavity washing device contributes to an enhanced washing effect inside the oral cavity.

An example of the oral cavity washing device enables the pump to feed the washing liquid to the inlet port such that a flow rate of the washing liquid ejected from the outlet port falls within a range of 200 mL/min to 350 mL/min. The flow passage structure has the third component, the reducer, and the fourth component so as to generate cavitation in the washing liquid flowing through the flow passage when the flow rate of the washing liquid ejected from the outlet port falls within a range of 200 mL/min to 350 mL/min.

Known technologies can improve the washing capability of oral cavity washing devices in terms of removal of stubborn stains by the spraying of washing liquid containing cavitation bubbles from their nozzle. However, when the influence of an oral cavity washing device on the oral cavity of a user is viewed from a broader perspective, appropriate removal of food residue and giving comfort to the user receiving washing liquid ejected into the oral cavity are important elements for the oral cavity washing device. The flow rate of the washing liquid ejected from the nozzle has influence on the removal of food residue and a feeling the user gets. Thus, the implementation of an oral cavity washing device capable of appropriately removing food residue, giving comfort to a user, and removing stubborn stains requires study on not only dimensions of a nozzle including a structure for cavitation generation but also the flow rate of washing liquid ejected from the nozzle. Unfortunately, the scope of conventional oral cavity washing devices contains no concept of implementing an oral cavity washing device capable of appropriately removing food residue, giving comfort to a user, and removing stubborn stains.

The inventor of the present application, against such a backdrop of conventional oral cavity washing devices, has studied an oral cavity washing device having a more desirable capability and invented an oral cavity washing device according to the present disclosure. The oral cavity washing device according to the present disclosure includes a pump to feed washing liquid to an inlet port of a nozzle such that a flow rate of the washing liquid ejected from an outlet port of the nozzle falls within a range of 200 mL/min to 350 mL/min. Test results and data confirm that washing liquid ejected from a nozzle into an oral cavity of a user can appropriately remove food residue and make the user feel comfortable when the flow rate of the washing liquid ejected from the nozzle falls within the range of 200 mL/min to 350 mL/min. Thus, the oral cavity washing device according to the present disclosure has a capability of appropriately removing food residue and a capability of giving comfort to the user. The oral cavity washing device according to the present disclosure further includes a third component, a reducer, and a fourth component so as to generate cavitation in the washing liquid when the flow rate of the washing liquid ejected from the outlet port of the nozzle falls within the range of 200 mL/min to 350 mL/min. This configuration provides washing liquid that can appropriate remove food residue, give comfort to a user and contain cavitation bubbles. Consequently, the oral cavity washing device according to the present disclosure has a capability of removing stubborn stains in addition to the capability of appropriately removing food residue and the capability of giving comfort to the user. This configuration allows the oral cavity washing device to provide enhanced added value.

An example of the oral cavity washing device is configured such that the reducer includes a first wall surface and a second wall surface that are on opposite sides of a center line of the flow passage in a cross section of the nozzle taken along the center line. An inclination of the first wall surface relative to the center line in the cross section of the nozzle is represented by a first tangent line that is a tangent line to the first wall surface, and an inclination of the second wall surface relative to the center line in the cross section of the nozzle is represented by a second tangent line that is a tangent line to the second wall surface. An angle formed by the first and second tangent lines falls within a range of 120° to 135° inclusive.

A test confirmed that the quantity of cavitation bubbles contained in the washing liquid is satisfactory for stain removal inside an oral cavity when the angle formed by the first and second tangent lines falls within the range of 120° to 135° inclusive.

An example of the oral cavity washing device is configured such that the fourth component includes a third wall surface and a fourth wall surface that are on the opposite sides of the center line of the flow passage in the cross section of the nozzle taken along the center line. An inclination of the third wall surface relative to the center line in the cross section of the nozzle is represented by a third tangent line that is a tangent line to the third wall surface, and an inclination of the fourth wall surface relative to the center line in the cross section of the nozzle is represented by a fourth tangent line that is a tangent line to the fourth wall surface. An angle formed by the third and fourth tangent lines falls within a range of 5.5° to 6.5° inclusive.

A test confirmed that the quantity of cavitation bubbles contained in the washing liquid is satisfactory for stain removal inside an oral cavity when the angle formed by the third and fourth tangent lines falls within the range of 5.5° to 6.5° inclusive.

An example of the oral cavity washing device is configured such that a flow passage part of the reducer is circular in cross section orthogonal to the center line of the flow passage. The reducer includes a small-diameter segment being closest to the outlet port and having a flow passage inner diameter that falls within a range of 0.55 mm to 0.65 mm inclusive.

A test confirmed that the oral cavity washing device produces a high washing effect when the small-diameter segment inner diameter falls within the range of 0.55 mm to 0.65 mm inclusive. This is presumably because of an increase in the quantity of cavitation bubbles contained in the washing liquid fed into an oral cavity.

An example of the oral cavity washing device is configured such that the fourth component extends over a distance from the reducer to the outlet port. A length of the fourth component along the center line of the flow passage falls within a range of 8.5 mm to 10.0 mm inclusive.

A test confirmed that the oral cavity washing device produces a high washing effect when the length of the fourth component falls within the range of 8.5 mm to 10.0 mm inclusive. This is presumably because of an increase in the quantity of cavitation bubbles contained in the washing liquid fed into an oral cavity.

An example of the oral cavity washing device is configured such that the second flow passage is circular in cross section orthogonal to the center line of the flow passage. An inner diameter of the second flow passage falls within a range of 1.0 mm to 1.4 mm inclusive.

A test confirmed that the oral cavity washing device produces a high washing effect when the inner diameter of the second flow passage falls within the range of 1.0 mm to 1.4 mm inclusive. This is presumably because of an increase in the quantity of cavitation bubbles contained in the washing liquid fed into an oral cavity.

An example of the oral cavity washing device is configured such that a length of the second component along the center line of the flow passage falls within a range of 3.0 mm to 5.0 mm inclusive.

A fluid velocity of the washing liquid flowing through the flow passage of the nozzle is difficult to rise if the length of the second component is short. If the length of the second component is long, the nozzle gets large. Thus, it is preferable that the length of the second component be specified based on a relationship between the fluid velocity of the washing liquid and the size of the nozzle. The length of the second component in the oral cavity washing device is specified based on the relationship described above. As a result, the oral cavity washing device contributes to the effect of washing inside an oral cavity and downsizing of the nozzle.

An example of the oral cavity washing device is configured such that a total length of the third component and the reducer along the center line of the flow passage falls within a range of 2.0 mm to 13.0 mm inclusive.

A test confirmed that the oral cavity washing device produces a high washing effect when the total length of the third component and the reducer falls within the range of 2.0 mm to 13.0 mm inclusive. This is presumably because of an increase in the quantity of cavitation bubbles contained in the washing liquid fed into an oral cavity.

A nozzle for an oral cavity washing device according to an exemplary embodiment of the present disclosure is equivalent to the nozzle of the oral cavity washing device described above.

The nozzle of the oral cavity washing device described above produces effects that are substantially identical to the effects produced by the oral cavity washing device described above.

(Exemplary Embodiment)

Oral cavity washing device 1 of FIG. 1 is used to wash an oral cavity, mainly to wash teeth and gums in an oral cavity. Oral cavity washing device 1 is placed on a flat installation surface such as a washstand (not shown). Oral cavity washing device 1 is driven by electric power supplied from an external power supply (not shown) such as a commercial power supply, and is configured to eject washing liquid into an oral cavity. Examples of the washing liquid include clean water, clean water mixed with detergent, and clean water.

Oral cavity washing device 1 includes body unit 10, tube 20, and washing unit 30. Body unit 10 includes device body 11 and tank 16. Tank 16 has a function of storing washing liquid. Tank 16 is detachably attached to device body 11, for example. Device body 11 accommodates various elements for driving oral cavity washing device 1. Device body 11 includes housing 12, pump 13, motor 14, power source part 15, and an operation part (not shown). Pump 13, motor 14, and power source part 15 are accommodated in housing 12. The operation part has a function of powering ON and powering OFF oral cavity washing device 1. The operation part is disposed onto housing 12, for example.

Pump 13 has a function of discharging the washing liquid stored in tank 16. Pump 13 is a piston pump, for example. Device body 11 further includes upstream flow passage 17A and downstream flow passage 17B. Upstream flow passage 17A connects inlet 13A of pump 13 with tank 16 such that the washing liquid flows to pump 13. Downstream flow passage 17B connects outlet 13B of pump 13 with tube 20 such that the washing liquid flows to tube 20. In one example, pump 13 suctions washing liquid flowing through upstream flow passage 17A via inlet 13A and discharges the washing liquid from outlet 13B into downstream flow passage 17B. Downstream flow passage 17B may be provided with a check valve (not shown) so as to feed the washing liquid flowing through downstream flow passage 17B into tube 20. Motor 14 has a function of driving pump 13. Power source part 15 has a function of supplying motor 14 with electric power. In one example, a power cord (not shown) provided on device body 11 is connected to an external power supply that supplies electric power to power source part 15.

Tube 20 connects body unit 10 with washing unit 30 such that the washing liquid discharged from pump 13 is fed to washing unit 30 via flow passage 21. Flow passage 21 is disposed inside tube 20. Examples of the material for tube 20 include a highly flexible resin material. The resin material is exemplified by an ethylene vinyl acetate copolymer (EVA) resin.

Washing unit 30 is detachably attached to body unit 10, for example. Washing unit 30 includes case 31 and nozzle 40. Case 31 is made of a material such as an acrylonitrile butadiene styrene (ABS) resin. The washing liquid flowing through flow passage 21 of tube 20 passes a flow passage (not shown) inside case 31 and is fed to nozzle 40. Case 31 includes grip portion 32. Grip portion 32 is configured to be gripped by a single hand of a user. Nozzle 40 has a function of ejecting the washing liquid fed from pump 13. Nozzle 40 is detachably attached to case 31, for example.

Washing unit 30 further includes operation part 33. Operation part 33 is disposed on grip portion 32. Operation part 33 has a function of opening and closing a check valve (not shown) provided in the flow passage inside case 31. When operation part 33 is operated to open the check valve, the washing liquid flowing through tube 20 is ejected from outlet port 41A of nozzle 40. When operation part 33 is operated to close the check valve, the washing liquid is not ejected from outlet port 41A of nozzle 40.

Nozzle 40 includes first section 41 and second section 42. First section 41 is situated nearer to outlet port 41A in comparison with second section 42. First section 41 is bent relative to second section 42, for example. In one example, center line CL (see FIG. 2) of nozzle 40 along first section 41 forms an angle of 55° with center line CL of nozzle 40 along second section 42. Examples of the material for nozzle 40 include resin materials. The resin materials are exemplified by an acrylonitrile styrene acrylate (ASA) resin, an ABS resin, and a polycarbonate (PC) resin.

Figure 2:
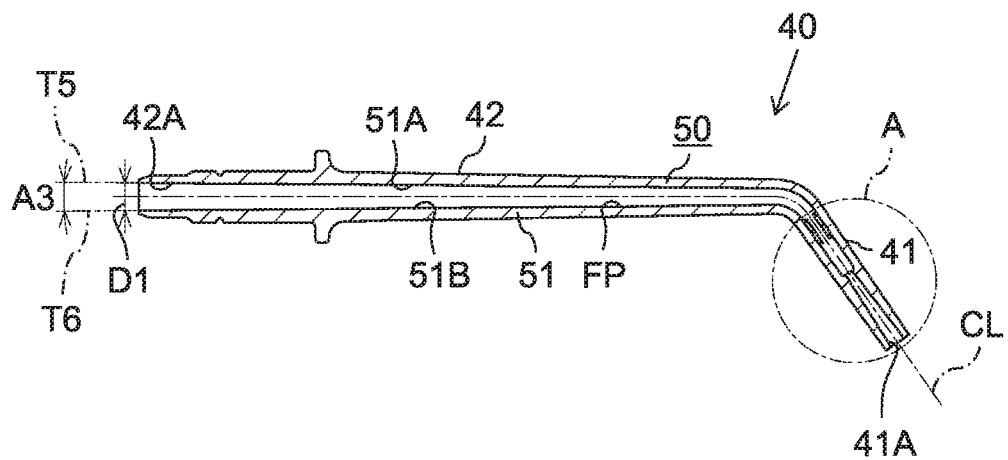
FIG. 2 is a cross-sectional view of a nozzle shown in FIG. 1.

FIG. 2 is a cross-sectional view of nozzle 40 taken along center line CL of flow passage FP. Nozzle 40 further includes flow passage structure 50. Flow passage FP is disposed in flow passage structure 50 of nozzle 40. Flow passage FP is, for example, circular in cross section orthogonal to center line CL of flow passage FP. The cross-sectional shape of flow passage FP is specified according to a criterion by which it is determined whether the shape facilitates the flow of washing liquid through flow passage FP, for example. Examples of the circular shape include substantially circular shapes that each produce an effect on a par with the circular shape in facilitation of the flow of washing liquid through flow passage FP. Examples of the substantially circular shapes include ellipses and round shapes that partly have microscopic projections or depressions.

Flow passage FP includes inlet port 42A and outlet port 41A. Inlet port 42A is disposed in second section 42, for example, and receives the washing liquid fed from pump 13 (see FIG. 1). Nozzle 40 is mounted on case 31 such that inlet port 42A is disposed inside case 31 and connected to the flow passage inside case 31. Inner diameter D1 of inlet port 42A is 3.4 mm, for example. Outlet port 41A is disposed in first section 41, for example, and is designed to eject the washing liquid flowing from inlet port 42A.

A length of nozzle 40 along flow passage FP of nozzle 40 is preferably within an exemplary range of 90 mm to 120 mm. The length of nozzle 40 is a length of flow passage FP across a range from inlet port 42A to outlet port 41A. In one example, the length of nozzle 40 is 105 mm. An example length of first section 41 along flow passage FP of nozzle 40 is 22 mm. An example tolerance for the length of first section 41 is ±1 mm. It is preferable that flow passage FP of nozzle 40 have an inner surface roughness of 0.2 μm or greater.

Pump 13 feeds the washing liquid to inlet port 42A such that a flow rate of the washing liquid ejected from outlet port 41A falls within a range of 200 mL/min to 350 mL/min. The range of a discharge pressure of pump 13 is preferably from 3.0 kgf/cm$^2$ to 8.0 kgf/cm$^2$ or the like. The washing liquid ejected from outlet port 41A of nozzle 40 has hydraulic pressure varied in accordance with the hydraulic pressure of the washing liquid discharged from pump 13.

Pump 13 has maximum discharge pressure preferably higher than predetermined maximum discharge pressure. The predetermined maximum discharge pressure is preferably determined in accordance with a relation with power of washing off plaque and the like in the oral cavity by the washing liquid ejected from outlet port 41A, for example. The predetermined maximum discharge pressure is preferred to be at least 4 kgf/cm$^2$ or the like. The predetermined maximum discharge pressure is more preferred to be at least 6 kgf/cm$^2$ or the like. In one example, the predetermined maximum discharge pressure is 8 kgf/cm$^2$.

Figure 3:
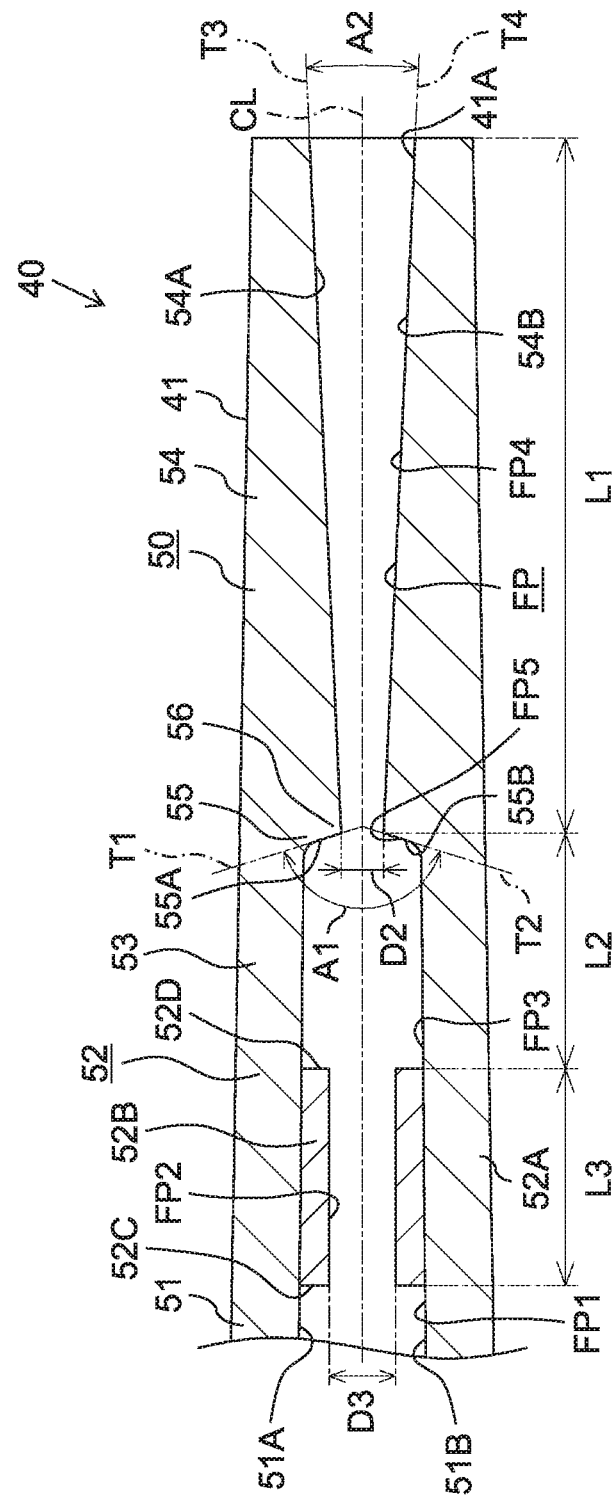
FIG. 3 is an enlarged view of portion A indicated in FIG. 2.

With reference to FIG. 3, a configuration of flow passage structure 50 will be described.

Flow passage structure 50 includes first component 51, second component 52, third component 53, fourth component 54, and reducer 55. First component 51 includes first flow passage FP1. Second component 52 includes second flow passage FP2. Second flow passage FP2 is disposed downstream of first component 51 and is narrower than first flow passage FP1. Third component 53 includes third flow passage FP3. Third flow passage FP3 is disposed downstream of second component 52 and is broader than second flow passage FP2.

Second component 52 includes outside-diameter part 52A and tubular part 52B. In second component 52, outside-diameter part 52A forms an outside diameter of nozzle 40. In second component 52, tubular part 52B forms an inside diameter of nozzle 40 and is disposed so as to protrude from outside-diameter part 52A toward center line CL of flow passage FP. Examples of the material for tubular part 52B include metallic materials. The metallic materials are exemplified by stainless steel coated with electroless nickel plating or other rustproofing treatment. In one example, tubular part 52B is welded to outside-diameter part 52A. Tubular part 52B includes first end surface 52C and second end surface 52D. In tubular part 52B, first end surface 52C is a face closest to inlet port 42A (see FIG. 2) and is substantially perpendicular to center line CL of flow passage FP, for example. In tubular part 52B, second end surface 52D is a face closest to outlet port 41A and is substantially perpendicular to center line CL of flow passage FP, for example.

Reducer 55 is disposed downstream of third component 53. Reducer 55 is configured so as to reduce a width of flow passage FP. Fourth component 54 includes fourth flow passage FP4. Fourth flow passage FP4 is disposed downstream of reducer 55 and widens with an advancement in the path from reducer 55 to outlet port 41A. Reducer 55 includes fifth flow passage FP5. Fifth flow passage FP5 connects third flow passage FP3 with fourth flow passage FP4 and narrows with an advancement in the path from third flow passage FP3 to fourth flow passage FP4. First flow passage FP1, second flow passage FP2, third flow passage FP3, fifth flow passage FP5, and fourth flow passage FP4 constitute flow passage FP. Flow passage structure 50 has third component 53, reducer 55, and fourth component 54 so as to generate cavitation in washing liquid flowing through flow passage FP when the flow rate of the washing liquid ejected from outlet port 41A of nozzle 40 falls within a range of 200 mL/min to 350 mL/min.

Reducer 55 includes first wall surface 55A and second wall surface 55B. First and second wall surfaces 55A and 55B are on opposite sides of center line CL of flow passage FP in a cross section of nozzle 40 taken along center line CL. An inclination of first wall surface 55A relative to center line CL in the cross section of nozzle 40 is represented by first tangent line T1 that is a tangent line to first wall surface 55A, whereas an inclination of second wall surface 55B relative to center line CL in the cross section of nozzle 40 is represented by second tangent line T2 that is a tangent line to second wall surface 55B. An angle formed by first and second tangent lines T1 and T2 (hereinafter referred to as "reducer angle A1") falls within a predetermined first angular range. The predetermined first angular range is specified such that the washing liquid ejected from outlet port 41A of nozzle 40 contains cavitation bubbles when the flow rate of the washing liquid falls within the range of 200 mL/min to 350 mL/min. The predetermined first angular range is preferably between an upper limit of 135° and a lower limit of 120° (inclusive), for example. When reducer angle A1 is 135° or less, the quantity of cavitation bubbles contained in the washing liquid is satisfactory for stain removal. A reducer angle A1 of 120° or greater contributes to an improvement in moldability of nozzle 40 formed using a mold. In one example, reducer angle A1 is 123°. An example tolerance for reducer angle A1 is ±2°.

Figure 4:
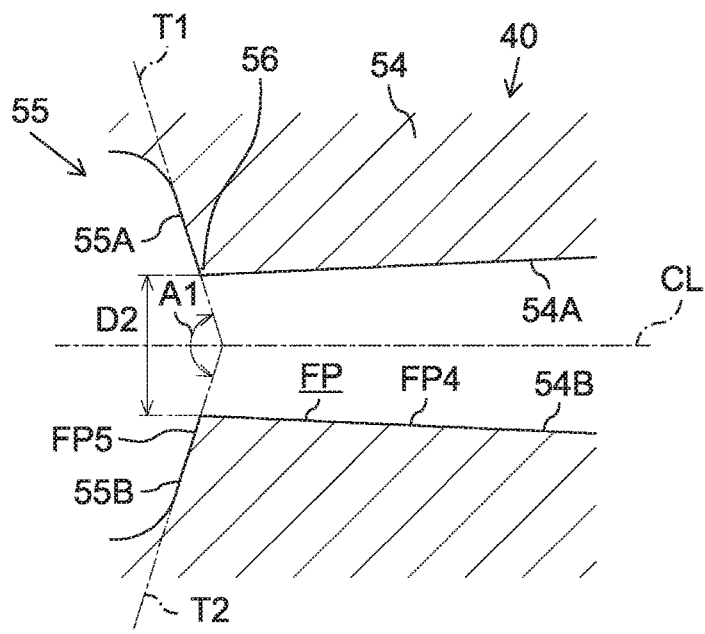
FIG. 4 is an enlarged view illustrating a reducer and a neighborhood of the reducer in FIG. 3.

With reference to FIG. 4, first and second wall surfaces 55A and 55B have respective curves. First tangent line T1 is a straight line connecting a portion of reducer 55 closest to outlet port 41A (see FIG. 3) with a portion immediately in front of the curve of first wall surface 55A, for example. Second tangent line T2 is a straight line connecting the portion of reducer 55 closest to outlet port 41A with a portion immediately in front of the curve of second wall surface 55B, for example.

Fifth flow passage FP5 is circular in cross section orthogonal to center line CL of flow passage FP. Reducer 55 includes small-diameter segment 56. Small-diameter segment 56 is a segment of reducer 55 closest to outlet port 41A and has a smallest inner diameter among other segments of reducer 55. The inner diameter of small-diameter segment 56 (hereinafter referred to as "small-diameter segment inner diameter D2") for fifth flow passage FP5 falls within a predetermined first inner diameter range. The predetermined first inner diameter range is specified such that the washing liquid ejected from outlet port 41A of nozzle 40 contains cavitation bubbles when the flow rate of the washing liquid falls within the range of 200 mL/min to 350 mL/min. The predetermined first inner diameter range is preferably between an upper limit of 0.65 mm and a lower limit of 0.55 mm (inclusive), for example. When small-diameter segment inner diameter D2 is 0.65 mm or smaller, the quantity of cavitation bubbles contained in the washing liquid is satisfactory for stain removal. When small-diameter segment inner diameter D2 is 0.55 mm or larger, the washing liquid is ejected from outlet port 41A of nozzle 40 at an appropriate flow rate. In one example, small-diameter segment inner diameter D2 is 0.65 mm. An example tolerance for small-diameter segment inner diameter D2 is ±0.02 mm.

With reference to FIG. 3, fourth component 54 includes third wall surface 54A and fourth wall surface 54B. Third and fourth wall surfaces 54A and 54B are on the opposite sides of center line CL of flow passage FP in the cross section of nozzle 40 taken along center line CL. An inclination of third wall surface 54A relative to center line CL in the cross section of nozzle 40 is represented by third tangent line T3 that is a tangent line to third wall surface 54A, whereas an inclination of fourth wall surface 54B relative to center line CL in the cross section of nozzle 40 is represented by fourth tangent line T4 that is a tangent line to fourth wall surface 54B. An angle formed by third and fourth tangent lines T3 and T4 (hereinafter referred to as "fourth component angle A2") falls within a predetermined second angular range. The predetermined second angular range is specified such that the washing liquid ejected from outlet port 41A of nozzle 40 contains cavitation bubbles when the flow rate of the washing liquid falls within the range of 200 mL/min to 350 mL/min. The predetermined second angular range is preferably between an upper limit of 6.5° and a lower limit of 5.5° (inclusive), for example. If fourth component angle A2 is 6.5° or less, the quantity of cavitation bubbles contained in the washing liquid is satisfactory for stain removal. A fourth component angle A2 of 5.5° or greater facilitates the application of pressure for cavitation generation to washing liquid flowing through fourth flow passage FP4. In one example, fourth component angle A2 is 6.0°. An example tolerance for fourth component angle A2 is ±0.5°.

Fourth component 54 extends over a distance from reducer 55 to outlet port 41A, for example. A length of fourth component 54 in a direction along center line CL of flow passage FP (hereinafter referred to as "fourth component length L1") falls within a predetermined first length range. The predetermined first length range is specified such that the washing liquid ejected from outlet port 41A of nozzle 40 contains cavitation bubbles when the flow rate of the washing liquid falls within the range of 200 mL/min to 350 mL/min. The predetermined first length range is preferably between an upper limit of 10.0 mm and a lower limit of 8.5 mm (inclusive), for example. A fourth component length L1 of 10.0 mm or shorter facilitates enhanced comfort given to the user. When fourth component length L1 is 8.5 mm or longer, the quantity of cavitation bubbles contained in the washing liquid is satisfactory for stain removal. In one example, fourth component length L1 is 9.0 mm. An example tolerance for fourth component length L1 is 0.1 mm.

A total length of third component 53 and reducer 55 in a direction along center line CL of flow passage FP (hereinafter referred to as "intermediate region length L2") falls within a predetermined second length range. The predetermined second length range is specified such that the washing liquid ejected from outlet port 41A of nozzle 40 contains cavitation bubbles when the flow rate of the washing liquid falls within the range of 200 mL/min to 350 mL/min. The predetermined second length range is preferably between an upper limit of 13.0 mm and a lower limit of 2.0 mm (inclusive), for example. When intermediate region length L2 is 13.0 mm or shorter, the quantity of cavitation bubbles contained in the washing liquid is satisfactory for stain removal. An intermediate region length L2 of 2.0 mm or longer facilitates the application of pressure for cavitation generation to washing liquid flowing through third flow passage FP3. In one example, intermediate region length L2 is 6.0 mm. An example tolerance for intermediate region length L2 is ±0.5 mm.

Second flow passage FP2 is circular in cross section orthogonal to center line CL of flow passage FP. An inner diameter for second flow passage FP2 (hereinafter referred to as "second flow passage inner diameter D3") falls within a predetermined second inner diameter range. The predetermined second inner diameter range is specified such that the washing liquid ejected from outlet port 41A of nozzle 40 contains cavitation bubbles when the flow rate of the washing liquid falls within the range of 200 mL/min to 350 mL/min. The predetermined second inner diameter range is preferably between an upper limit of 1.4 mm and a lower limit of 1.0 mm (inclusive), for example. A second flow passage inner diameter D3 of 1.4 mm or smaller increases a fluid velocity of washing liquid flowing through second flow passage FP2. When second flow passage inner diameter D3 is 1.0 mm or larger, the quantity of cavitation bubbles contained in the washing liquid is satisfactory for stain removal. In one example, second flow passage inner diameter D3 is 1.4 mm. An example tolerance for second flow passage inner diameter D3 is ±0.05 mm.

A length of second component 52 in a direction along center line CL of flow passage FP (hereinafter referred to as "second component length L3") falls within a predetermined third length range. The predetermined third length range is specified such that the washing liquid ejected from outlet port 41A of nozzle 40 contains cavitation bubbles when the flow rate of the washing liquid falls within the range of 200 mL/min to 350 mL/min. The predetermined third length range is preferably between an upper limit of 5.0 mm and a lower limit of 3.0 mm (inclusive), for example. When second component length L3 is 5.0 mm or shorter, nozzle 40 comes down in size in the direction along center line CL. A second component length L3 of 3.0 mm or longer increases fluid velocity of washing liquid flowing through second flow passage FP2 and ensures that the quantity of cavitation bubbles contained in the washing liquid is satisfactory for stain removal. In one example, second component length L3 is 3.0 mm. An example tolerance for second component length L3 is ±0.1 mm.

With reference to FIG. 2, first component 51 includes fifth wall surface 51A and sixth wall surface 51B. Fifth and sixth wall surfaces 51A and 51B are on the opposite sides of center line CL of flow passage FP in the cross section of nozzle 40 taken along center line CL. An inclination of fifth wall surface 51A relative to center line CL in the cross section of nozzle 40 is represented by fifth tangent line T5 that is a tangent line to fifth wall surface 51A, whereas an inclination of sixth wall surface 51B relative to center line CL in the cross section of nozzle 40 is represented by sixth tangent line T6 that is a tangent line to sixth wall surface 51B. It is preferable that an angle formed by fifth and sixth tangent lines T5 and T6 (hereinafter referred to as "first component angle A3") fall within a range of 1.0° to 2.0°.

Figure 5:
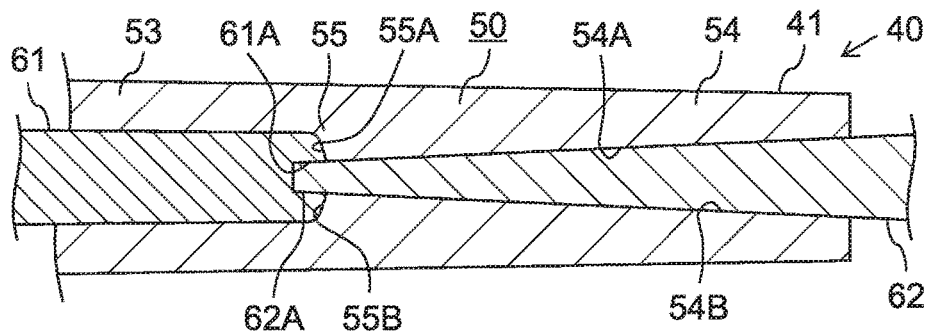
FIG. 5 is a cross-sectional view illustrating an example first process in a method of manufacturing the nozzle in FIG. 1.
Figure 6:
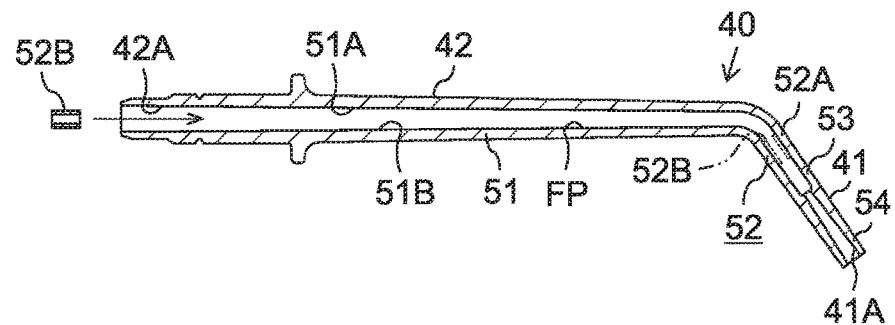
FIG. 6 is a cross-sectional view illustrating an example second process in the method of manufacturing the nozzle in FIG. 1.

With reference to FIGS. 5 and 6, an example method for producing nozzle 40 will now be described.

Nozzle 40 is produced by going through the following procedure, for example. In a first process shown in FIG. 5, an intermediate product for nozzle 40 is produced by injection molding. In one example, the intermediate product for nozzle 40 is produced using first part 61 and second part 62. An outline of first part 61 runs along wall surfaces 51A, 51B of first component 51 and wall surfaces 55A, 55B of reducer 55, for example. A surface of a portion of first part 61 between first component 51 and reducer 55 extends along wall surfaces of outside-diameter part 52A of second component 52 and third component 53 that constitute a part of flow passage FP. First part 61 includes recess 61A. An outline of second part 62 runs along wall surfaces 54A, 54B of fourth component 54, for example. Second part 62 includes insertion 62A. Insertion 62A is designed to be put inside recess 61A.

First and second parts 61 and 62 are inserted into a mold (not shown) for forming a contour of nozzle 40 such that insertion 62A of second part 62 is put inside recess 61A of first part 61. Next, a heated resin is charged into the mold so that the charged resin is solidified. First and second parts 61 and 62 are pulled out of the mold, and a produced intermediate product for nozzle 40 is taken out of the mold. The intermediate product for nozzle 40 is produced by following the steps above. Nozzle 40 provides improved moldability because reducer angle A1 falls within the predetermined first angular range. First part 61 can be readily pulled out of the mold because first component angle A3 falls within the range of 1.0° to 2.0°.

In a second process shown in FIG. 6, tubular part 52B for second component 52 is mounted on outside-diameter part 52A. Specifically, tubular part 52B is inserted from inlet port 42A of nozzle 40 and is welded to outside-diameter part 52A. In FIG. 6, a two-dot chain line indicates tubular part 52B mounted on outside-diameter part 52A. Nozzle 40 is produced by following the procedure above.

With reference to FIGS. 1 to 3, an example method for using oral cavity washing device 1 will be described.

Oral cavity washing device 1 is used by a user or the like in a following manner. In a first step, a predetermined amount of the washing liquid is poured into tank 16, and tank 16 is attached to device body 11. In a second step, the operation part of body unit 10 is operated to power on oral cavity washing device 1. When oral cavity washing device 1 is powered on, pump 13 starts being driven. In a third step, grip portion 32 of washing unit 30 is grasped, and outlet port 41A of nozzle 40 is directed into an oral cavity. In a fourth step, operation part 33 of washing unit 30 is operated to eject the washing liquid from outlet port 41A. The washing liquid ejected from outlet port 41A thus washes the oral cavity.

The washing liquid discharged from pump 13 passes through flow passage FP of nozzle 40 in a process for ejecting the washing liquid from outlet port 41A. Since pressure put on the washing liquid flowing through fifth flow passage FP5 of reducer 55 falls below a saturated vapor pressure and pressure put on the washing liquid flowing through fourth flow passage FP4 of fourth component 54 recovers to the saturated vapor pressure or higher, cavitation occurs in the washing liquid flowing through flow passage FP of nozzle 40. This configuration readily removes plaque or other stubborn stains by impact resulting from a burst of cavitation bubbles contained in the washing liquid ejected from outlet port 41A of nozzle 40 into the oral cavity.

It is proven that washing liquid ejected into the oral cavity of a user appropriately removes food residue and makes the user feel comfortable when the flow rate of the washing liquid ejected from outlet port 41A of nozzle 40 falls within the range of 200 mL/min to 350 mL/min. In this way, oral cavity washing device 1 has a capability of appropriately removing food residue, a capability of giving comfort to the user, and a capability of removing stubborn stains. As a result, oral cavity washing device 1 provides enhanced added value.

Meanwhile, it is preferable that the fluid velocity of washing liquid flowing through flow passage FP of nozzle 40 be higher than a predetermined fluid velocity to generate a satisfactory quantity of cavitation bubbles for stain removal inside the oral cavity. The fluid velocity of washing liquid is determined by the discharge pressure of pump 13, for example. Thus, oral cavity washing device 1 is preferably equipped with a pump (hereinafter referred to as a "virtual pump") that provides discharge pressure such that the fluid velocity of washing liquid gets higher than the predetermined fluid velocity. However, an oral cavity washing device equipped with a virtual pump creates loud noise due to driving of the virtual pump.

In light of this disadvantage, oral cavity washing device 1 has flow passage structure 50 including second component 52 so as to allow washing liquid flowing through flow passage FP of nozzle 40 to pass through second flow passage FP2 and thus increases the fluid velocity of washing liquid entering into fifth flow passage FP5 and fourth flow passage FP4. This configuration facilitates the generation of a satisfactory quantity of cavitation bubbles for stain removal inside the oral cavity even if oral cavity washing device 1 is equipped with pump 13 that provides a maximum discharge pressure lower than the maximum discharge pressure of the virtual pump. Accordingly, oral cavity washing device 1 contributes to an enhanced washing effect inside the oral cavity without creating loud noise.

(Example)

The inventor of the present application conducted first to sixth tests to assess effect produced by the configuration of flow passage structure 50 of oral cavity washing device 1. In the first and second tests, the inventor measured the extent of generation of cavitation bubbles using oral cavity washing device 1 according to the exemplary embodiment (hereinafter referred to as "oral cavity washing device 1 of the example") and an oral cavity washing device of a comparative example. In the third to sixth tests, the inventor measured washing capabilities exhibited by oral cavity washing device 1 of the example and the oral cavity washing device of the comparative example to wash samples that were used in addition to these oral cavity washing devices.

The first test will be described in detail. In the first test, oral cavity washing device 1 of the example had the following specifications. Tube 20 was made from an EVA resin. Tube 20 was 1 m long. The flow rate of the washing liquid ejected from outlet port 41A of nozzle 40 fell within the range of 200 mL/min to 350 mL/min. Nozzle 40 was made from an ASA resin. Reducer angle A1 differed from sample to sample within a range of 120° to 135° inclusive. First component angle A3 was 1.0°. Fourth component angle A2 was 6.0°. Small-diameter segment inner diameter D2 was 0.65 mm. Fourth component length L1 was 9.0 mm. Inner diameter D1 of inlet port 42A was 3.4 mm. The inner diameter of outlet port 41A was 1.59 mm. The washing liquid was clean water. Specifications of the oral cavity washing device of the comparative example were substantially the same as the specifications of oral cavity washing device 1 of the example with the exception of reducer angle A1. The oral cavity washing device of the comparative example had reducer angle A1 that differed from sample to sample within a range of 140° to 145° inclusive.

Figures 7, 8, 9:
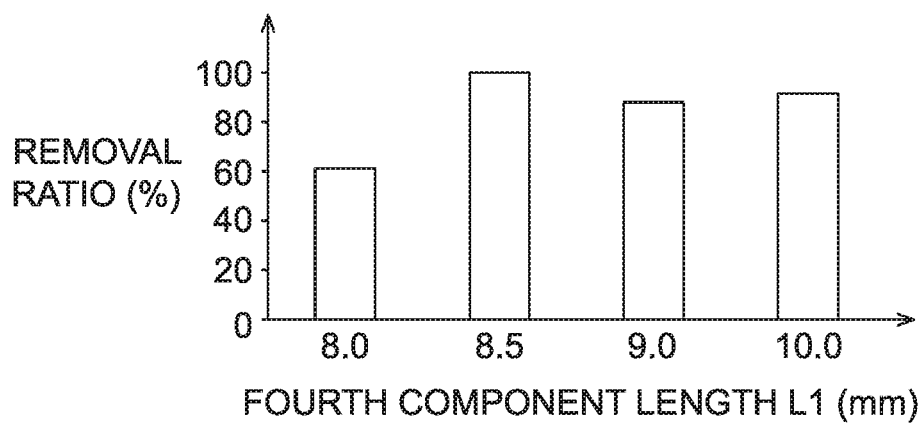
FIG. 7 is a table showing results of a first test.
FIG. 8 is a table showing results of a second test.
FIG. 9 is a graph showing results of a third test.

The first test measured whether or not the washing liquid ejected from nozzle 40 to each sample contained cavitation bubbles. The measurement method was a visual inspection through use of a high-speed video camera. FIG. 7 shows results of the first test. The test confirmed that the washing liquid ejected from nozzle 40 contained practically no cavitation bubbles when reducer angle A1 was 140° or greater. The results marked with the symbol "×" in FIG. 7 show that the state as described above was observed. States in which the washing liquid contains practically no cavitation bubbles include a state in which the washing liquid contains no cavitation bubble at all and a state in which the quantity of cavitation bubbles contained in the washing liquid is so minute that the cavitation bubbles make no contribution to stain removal. The test confirmed that the washing liquid ejected from nozzle 40 contained cavitation bubbles when reducer angle A1 was 135° or less. The test confirmed that the washing liquid ejected from nozzle 40 contained cavitation bubbles when reducer angle A1 was 120° or greater. The results marked with the symbol "○" in FIG. 7 show that the state as described above was observed. The first test confirmed that oral cavity washing device 1 displayed an improved washing capability when reducer angle A1 fell within the range of 120° to 135° inclusive.

The second test will be described in detail. In the second test, oral cavity washing device 1 of the example had the following specifications. Oral cavity washing devices 1 of the example in the first and second tests were similar to each other except for specifications in reducer angle A1 and fourth component angle A2. In the second test, reducer angle A1 was 123°. Fourth component angle A2 differed from sample to sample within a range of 5.5° to 6.5° inclusive. Specifications of the oral cavity washing device of the comparative example were substantially the same as the specifications of oral cavity washing device 1 of the example with the exception of fourth component angle A2. The oral cavity washing device of the comparative example had fourth component angle A2 that differed from sample to sample within a range of 7.0° to 7.5° inclusive.

The second test measured whether or not the washing liquid ejected from nozzle 40 to each sample contained cavitation bubbles. The measurement method was a visual inspection through use of a high-speed video camera. FIG. 8 shows results of the second test. The test confirmed that the washing liquid ejected from nozzle 40 contained practically no cavitation bubbles when fourth component angle A2 was 7.0° or greater. The results marked with the symbol "×" in FIG. 8 show that the state as described above was observed. The test confirmed that the washing liquid ejected from nozzle 40 contained cavitation bubbles when fourth component angle A2 was 6.5° or less. The test confirmed that the washing liquid ejected from nozzle 40 contained cavitation bubbles if fourth component angle A2 was 5.5° or greater. The results marked with the symbol "○" in FIG. 8 show that the state as described above was observed. The second test confirmed that oral cavity washing device 1 displayed an improved washing capability if fourth component angle A2 fell within the range of 5.5° to 6.5° inclusive.

The third test will be described in detail. In the third test, oral cavity washing device 1 of the example had the following specifications. Oral cavity washing devices 1 of the example in the first and third tests were similar to each other except for specifications in reducer angle A1 and fourth component length L1. In the third test, reducer angle A1 was 123°. Fourth component length L1 differed from sample to sample within a range of 8.5 mm to 10.0 mm inclusive. Specifications of the oral cavity washing device of the comparative example were substantially the same as the specifications of oral cavity washing device 1 of the example with the exception of fourth component length L1. The oral cavity washing device of the comparative example measured 8.0 mm in fourth component length L1.

Samples subject to washing in the third test were glass plates to which material X was applied. Material X was applied to each of the glass plates such that a layer of material X was formed throughout one surface of each glass plate. Material X has a quality similar to that of a stain or plaque attached to teeth. Material X is artificial plaque, for example. In the third test, washing liquid was ejected from nozzle 40 at a distance of 2.0 mm between outlet port 41A of nozzle 40 and the sample for a certain period of time. After completion of the spraying of the washing liquid, the quantity of material X left on the glass plate was measured. A washing capability of oral cavity washing device 1 was assessed by calculating a ratio of area S2 to area S1 (hereinafter referred to as a "removal ratio") based on measured results, where area S1 was an area covered by the ejected washing liquid on the glass plate and area S2 was an area covered by material X left in area S1 after spraying of the washing liquid. FIG. 9 shows results of the third test.

The test confirmed that the removal ratio was low when fourth component length L1 was 8.0 mm. This indicates that the quantity of cavitation bubbles contained in the washing liquid ejected from nozzle 40 was inadequate to remove stains. The test confirmed that the removal ratio was high when fourth component length L1 was 10.0 mm or shorter. This indicates that the quantity of cavitation bubbles contained in the washing liquid ejected from nozzle 40 was adequate to remove stains. The test confirmed that the removal ratio was high if fourth component length L1 was 8.5 mm or longer. The third test confirmed that oral cavity washing device 1 displayed an improved washing capability when fourth component length L1 fell within the range of 8.5 mm to 10.0 mm inclusive.

The fourth test will be described in detail. In the fourth test, oral cavity washing device 1 of the example had the following specifications. Oral cavity washing devices 1 of the example in the first and fourth tests were similar to each other except for specifications in reducer angle A1, small-diameter segment inner diameter D2, second flow passage inner diameter D3, and intermediate region length L2. In the fourth test, reducer angle A1 was 123°. Small-diameter segment inner diameter D2 was 0.55 mm. Second flow passage inner diameter D3 differed from sample to sample within a range of 0.7 mm to 1.4 mm inclusive. Intermediate region length L2 differed from sample to sample within a range of 2.0 mm to 16.0 mm inclusive. Specifications of the oral cavity washing device of the comparative example were substantially the same as the specifications of oral cavity washing device 1 of the example with the exception of second flow passage inner diameter D3 and intermediate region length L2. The oral cavity washing device of the comparative example had second flow passage inner diameter D3 that differed from sample to sample within a range of 0.7 mm to 1.4 mm inclusive. The oral cavity washing device of the comparative example measured 0 mm in intermediate region length L2. Thus, the oral cavity washing device of the comparative example had neither third component 53 nor reducer 55. The fourth test shared the assessment method with the third test. FIG. 10 shows results of the fourth test.

The test confirmed that no stain was removed when intermediate region length L2 was 0 mm. This indicates that the washing liquid ejected from nozzle 40 contained no cavitation bubbles. The results marked with the symbol "×" in FIG. 10 show that the state as described above was observed. The test confirmed that the removal ratio was low when second flow passage inner diameter D3 was 0.9 mm or smaller and intermediate region length L2 was 2.0 mm or longer. This indicates that the quantity of cavitation bubbles contained in the washing liquid ejected from nozzle 40 was inadequate to remove stains. The results marked with the symbol "Δ" in FIG. 10 show that the state as described above was observed. The test confirmed that the removal ratio was high when second flow passage inner diameter D3 fell within the range of 1.0 mm to 1.4 mm inclusive and intermediate region length L2 fell within the range of 2.0 mm to 12.0 mm inclusive. This indicates that the quantity of cavitation bubbles contained in the washing liquid ejected from nozzle 40 was adequate to remove stains. The results marked with either the symbol "○" or "⊙" in FIG. 10 show that the state as described above was observed. In FIG. 10, the symbol "⊙" indicates a higher removal ratio than the symbol "○". The fourth test confirmed that oral cavity washing device 1 displayed an improved washing capability if small-diameter segment inner diameter D2 was 0.55 mm, second flow passage inner diameter D3 fell within the range of 1.0 mm to 1.4 mm inclusive, and intermediate region length L2 fell within the range of 2.0 mm to 12.0 mm inclusive.

The fifth test will be described in detail. In the fifth test, oral cavity washing device 1 of the example had the following specifications. Oral cavity washing devices 1 of the example in the first and the fifth tests were similar to each other except for specifications in reducer angle A1, small-diameter segment inner diameter D2, second flow passage inner diameter D3, and intermediate region length L2. In the fifth test, reducer angle A1 was 123°. Small-diameter segment inner diameter D2 was 0.65 mm. Second flow passage inner diameter D3 differed from sample to sample within a range of 0.7 mm to 1.4 mm inclusive. Intermediate region length L2 differed from sample to sample within a range of 2.0 mm to 17.0 mm inclusive. Specifications of the oral cavity washing device of the comparative example were substantially the same as the specifications of oral cavity washing device 1 of the example with the exception of second flow passage inner diameter D3 and intermediate region length L2. The oral cavity washing device of the comparative example had second flow passage inner diameter D3 that differed from sample to sample within a range of 0.7 mm to 1.4 mm inclusive. The oral cavity washing device of the comparative example measured 0 mm in intermediate region length L2. Thus, the oral cavity washing device of the comparative example had neither third component 53 nor reducer 55. The fifth test shared the assessment method with the third test. FIG. 11 shows results of the fifth test.

The test confirmed that no stain was removed when intermediate region length L2 was 0 mm. This indicates that the washing liquid ejected from nozzle 40 contained no cavitation bubbles. The results marked with the symbol "×" in FIG. 11 show that the state as described above was observed. The test confirmed that the removal ratio was low when second flow passage inner diameter D3 was 0.9 mm or smaller and intermediate region length L2 was 2.0 mm or longer. This indicates that the quantity of cavitation bubbles contained in the washing liquid ejected from nozzle 40 was inadequate to remove stains. The results marked with the symbol "Δ" in FIG. 11 show that the state as described above was observed. The test confirmed that the removal ratio was high when second flow passage inner diameter D3 fell within the range of 1.0 mm to 1.4 mm inclusive and intermediate region length L2 fell within the range of 2.0 mm to 13.0 mm inclusive. This indicates that the quantity of cavitation bubbles contained in the washing liquid ejected from nozzle 40 was adequate to remove stains. The results marked with either the symbol "○" or "⊙" in FIG. 11 show that the state as described above was observed. In FIG. 11, the symbol "⊙" indicates a higher removal ratio than the symbol "○". The fifth test confirmed that oral cavity washing device 1 displayed an improved washing capability when small-diameter segment inner diameter D2 was 0.65 mm, second flow passage inner diameter D3 fell within the range of 1.0 mm to 1.4 mm inclusive, and intermediate region length L2 fell within the range of 2.0 mm to 13.0 mm inclusive.

The sixth test will be described in detail. In the sixth test, oral cavity washing device 1 of the example had the following specifications. Oral cavity washing devices 1 of the example in the first and the sixth tests were similar to each other except for specifications in reducer angle A1, small-diameter segment inner diameter D2, second flow passage inner diameter D3, and intermediate region length L2. In the sixth test, reducer angle A1 was 123°. Small-diameter segment inner diameter D2 was 0.75 mm. Second flow passage inner diameter D3 differed from sample to sample within a range of 0.7 mm to 1.4 mm inclusive. Intermediate region length L2 differed from sample to sample within a range of 2.0 mm to 13.0 mm inclusive. Specifications of the oral cavity washing device of the comparative example were substantially the same as the specifications of oral cavity washing device 1 of the example with the exception of second flow passage inner diameter D3 and intermediate region length L2. The oral cavity washing device of the comparative example had second flow passage inner diameter D3 that differed from sample to sample within a range of 0.7 mm to 1.4 mm inclusive. The oral cavity washing device of the comparative example measured 0 mm in intermediate region length L2. Thus, the oral cavity washing device of the comparative example had neither third component 53 nor reducer 55. The sixth test shared the assessment method with the third test. FIG. 12 shows results of the sixth test.

The test confirmed that no stain was removed when intermediate region length L2 was 0 mm. This indicates that the washing liquid ejected from nozzle 40 contained no cavitation bubbles. The results marked with the symbol "×" in FIG. 12 show that the state as described above was observed. The test confirmed that the removal ratio was low when intermediate region length L2 was 2.0 mm or longer. This indicates that the quantity of cavitation bubbles contained in the washing liquid ejected from nozzle 40 was inadequate to remove stains. The results indicated with high removal ratios in the fourth to the sixth tests confirmed that oral cavity washing device 1 displayed an improved washing capability when small-diameter segment inner diameter D2 fell within the range of 0.55 mm to 0.65 mm inclusive, second flow passage inner diameter D3 fell within the range of 1.0 mm to 1.4 mm inclusive, and intermediate region length L2 fell within the range of 2.0 mm to 13.0 mm inclusive.

(Modifications)

The exemplary embodiment exemplarily describes the oral cavity washing device and the nozzle for the same in a practicable mode of the present disclosure, and does not intend to limit the mode. The present disclosure can include, in addition to the exemplary embodiment, following modifications of the exemplary embodiment, and any configurations acquired by combining at least two modifications which do not contradict with each other, for example.

The first process in the method for producing nozzle 40 may be modified appropriately. In one example, the intermediate product for nozzle 40 is produced by insert molding.

Figure 13:
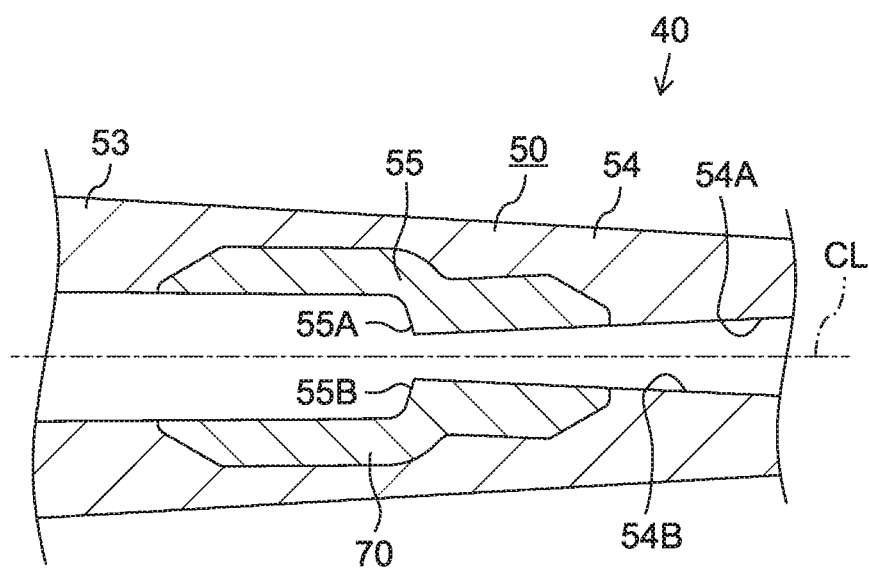
FIG. 13 is a cross-sectional view illustrating a method of manufacturing a nozzle according to a first modification example.

In a first example shown in FIG. 13, prime constituent 70 is produced first to form wall surfaces 55A, 55B of reducer 55 and wall surfaces 54A, 54B of the surrounding components. In one example, prime constituent 70 is produced using first and second parts 61 and 62 (see FIG. 5), and a mold (not shown) for forming a contour of prime constituent 70. Next, first and second parts 61 and 62, and prime constituent 70 are inserted into a mold (not shown) for forming a contour of nozzle 40 such that first and second parts 61 and 62 support prime constituent 70. A heated resin is charged into the mold so that an intermediate product for nozzle 40, the intermediate product containing prime constituent 70 is produced.

Figure 14:
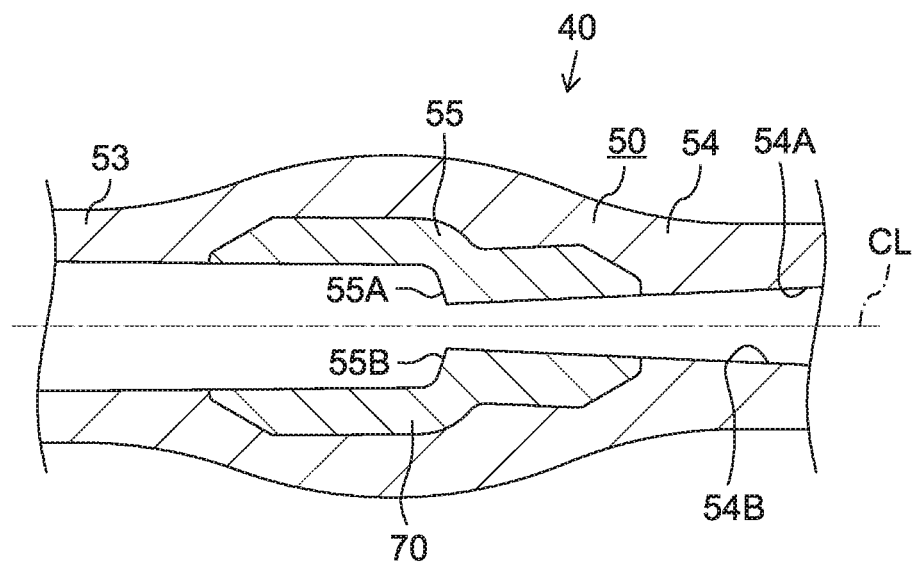
FIG. 14 is a cross-sectional view illustrating a method of manufacturing a nozzle according to a second modification example.

A second example shown in FIG. 14 differs from the first example in the mold for forming the contour of nozzle 40. Production of the intermediate product for nozzle 40 by insert molding involves covering prime constituent 70 with a heated resin. Thus, the method in the first example uses a mold that allows nozzle 40 to have a large outside diameter on the whole. Meanwhile, in the second example, an intermediate product for nozzle 40 is produced by using a mold that makes an outside diameter of nozzle 40 large only in a portion covering prime constituent 70. This allows nozzle 40 to come down in size.

The size of reducer angle A1 may be modified appropriately. In the first example, reducer angle A1 is less than 120°. In the second example, reducer angle A1 is greater than 135°.

The size of fourth component angle A2 may be modified appropriately. In the first example, fourth component angle A2 is less than 5.5°. In the second example, fourth component angle A2 is greater than 6.5°.

The size of small-diameter segment inner diameter D2 may be modified appropriately. In the first example, small-diameter segment inner diameter D2 is smaller than 0.55 mm. In the second example, small-diameter segment inner diameter D2 is larger than 0.65 mm.

The size of fourth component length L1 may be modified appropriately. In the first example, fourth component length L1 is shorter than 8.5 mm. In the second example, fourth component length L1 is longer than 10.0 mm.

The size of second flow passage inner diameter D3 may be modified appropriately. In the first example, second flow passage inner diameter D3 is smaller than 1.0 mm. In the second example, second flow passage inner diameter D3 is larger than 1.4 mm.

The size of intermediate region length L2 may be modified appropriately. In the first example, intermediate region length L2 is shorter than 2.0 mm. In the second example, intermediate region length L2 is longer than 13.0 mm.

The size of second component length L3 may be modified appropriately. In the first example, second component length L3 is shorter than 3.0 mm. In the second example, second component length L3 is longer than 5.0 mm.

The flow rate of the washing liquid ejected from outlet port 41A of nozzle 40 may be modified appropriately. In the first example, the flow rate of the washing liquid ejected from outlet port 41A is lower than 200 mL/min. In the second example, the flow rate of the washing liquid ejected from outlet port 41A is higher than 350 mL/min.

The relationship between first end surface 52C of tubular part 52B and center line CL of flow passage FP may be modified appropriately. In the first example, first end surface 52C is tilted relative to center line CL. In the second example, first end surface 52C is bent relative to center line CL. Similarly, second end surface 52D of tubular part 52B may receive any of the modifications.

The shape of nozzle 40 may be modified appropriately. In an example of nozzle 40, first section 41 is not bent relative to second section 42.

The oral cavity washing device and the nozzle for the same according to the present disclosure can find application in oral cavity washing devices for households and businesses.

What is claimed is:

1. An oral cavity washing device comprising:
    a nozzle having a flow passage structure including a flow passage that includes an inlet port for receiving washing liquid and an outlet port for ejecting the washing liquid; and
    a pump to feed the washing liquid to the inlet port, wherein the flow passage structure includes:
        a first component having a first flow passage;
        a second component being disposed downstream of the first component and having a second flow passage that is narrower than the first flow passage, the second component including a tubular part that protrudes into the flow passage, wherein the tubular part includes a first end surface facing the inlet port and extending perpendicular to a center line of the flow passage, a second end surface facing the outlet port and extending perpendicular to the center line of the flow passage, and the tubular part reduces a width of the second flow passage in the tubular part to a first width;
        a third component being disposed downstream of the second component and having a third flow passage that is broader than the second flow passage;
        a reducer being disposed downstream of the third component and being configured to reduce a width of the third flow passage at the reducer to a second width that is smaller than the first width; and
        a fourth component being disposed downstream of the reducer and having a fourth flow passage that widens with an advancement in a path from the reducer to the outlet port so as to generate cavitation in the washing liquid.

2. The oral cavity washing device according to claim 1, wherein the pump feeds the washing liquid to the inlet port such that a flow rate of the washing liquid ejected from the outlet port falls within a range of 200 mL/min to 350 mL/min, and
    wherein the flow passage structure has the third component, the reducer, and the fourth component so as to generate cavitation in the washing liquid flowing through the flow passage on condition that the flow rate of the washing liquid ejected from the outlet port falls within a range of 200 mL/min to 350 mL/min.

3. The oral cavity washing device according to claim 2, wherein the reducer includes a first wall surface and a second wall surface that are on opposite sides of the center line of the flow passage in a cross section of the nozzle taken along the center line, and
    wherein the first wall surface is inclined relative to the center line in the cross section of the nozzle, and the second wall surface is inclined relative to the center line in the cross section of the nozzle, an angle between the first wall surface and the second wall surface is in a range of 120° to 135° inclusive.

4. The oral cavity washing device according to claim 2, wherein the fourth component includes a third wall surface and a fourth wall surface that are on opposite sides of the center line of the flow passage in the cross section of the nozzle taken along the center line, and wherein the third wall surface is inclined relative to the center line in the cross section of the nozzle, and the fourth wall surface is inclined relative to the center line in the cross section of the nozzle, an angle between the third wall surface and the fourth wall surface is in a range of 5.5° to 6.5° inclusive.

5. The oral cavity washing device according to claim 2, wherein the flow passage included in the reducer is circular in cross section orthogonal to the center line of the flow passage, and
wherein the reducer includes a small-diameter segment being closest to the outlet port and an inner diameter of the small-diameter segment is within a range of 0.55 mm to 0.65 mm inclusive.

6. The oral cavity washing device according to claim 2, wherein the fourth component extends over a distance from the reducer to the outlet port, and
wherein a length of the fourth component along the center line of the flow passage falls within a range of 8.5 mm to 10.0 mm inclusive.

7. The oral cavity washing device according to claim 2, wherein the second flow passage is circular in cross section orthogonal to the center line of the flow passage, and
wherein an inner diameter of the second flow passage falls within a range of 1.0 mm to 1.4 mm inclusive.

8. The oral cavity washing device according to claim 2, wherein a length of the second component along the center line of the flow passage falls within a range of 3.0 mm to 5.0 mm inclusive.

9. The oral cavity washing device according to claim 2, wherein a total length of the third component and the reducer along the center line of the flow passage falls within a range of 2.0 mm to 13.0 mm inclusive.

10. A nozzle used in the oral cavity washing device, comprising:
a flow passage structure including a flow passage that includes an inlet port for receiving washing liquid and an outlet port for ejecting the washing liquid, wherein the flow passage structure includes:
a first component having a first flow passage;
a second component being disposed downstream of the first component and having a second flow passage that is narrower than the first flow passage, the second component including a tubular part that protrudes into the flow passage, wherein the tubular part includes a first end surface facing the inlet port and extending perpendicular to a center line of the flow passage, a second end surface facing the outlet port and extending perpendicular to the center line of the flow passage, and the tubular part reduces a width of the second flow passage in the tubular part to a first width;
a third component being disposed downstream of the second component and having a third flow passage that is broader than the second flow passage;
a reducer being disposed downstream of the third component and being configured to reduce a width of the third flow passage at the reducer to a second width that is smaller than the first width; and
a fourth component being disposed downstream of the reducer and having a fourth flow passage that widens with an advancement in a path from the reducer to the outlet port so as to generate cavitation in the washing liquid.

* * * * *